US012629715B2

(12) United States Patent
Wilson et al.

(10) Patent No.: US 12,629,715 B2
(45) Date of Patent: May 19, 2026

(54) APPARATUS AND METHOD FOR THE MANUFACTURE OF NOODLES

(71) Applicants: SHORT BROTHERS PLC, Belfast (GB); SPIRIT AEROSYSTEMS (EUROPE) LIMITED, London (GB)

(72) Inventors: Robert Samuel Wilson, Belfast (GB); Mark Braniff, Belfast (GB); Alan Moore, Belfast (GB); Zacharias Kakaratsios, Ayrshire (GB)

(73) Assignees: Short Brothers PLC, Belfast (GB); Spirit AeroSystems Europe Limited, London (GB)

( * ) Notice: Subject to any disclaimer, the term of this patent is extended or adjusted under 35 U.S.C. 154(b) by 85 days.

(21) Appl. No.: 18/633,109

(22) Filed: Apr. 11, 2024

(65) Prior Publication Data

US 2024/0342743 A1 Oct. 17, 2024

(30) Foreign Application Priority Data

Apr. 12, 2023 (GB) ...................................... 2305375

(51) Int. Cl.
*B05C 5/02* (2006.01)
*B05C 11/02* (2006.01)
*B29D 99/00* (2010.01)

(52) U.S. Cl.
CPC .......... *B05C 5/0216* (2013.01); *B05C 11/025* (2013.01); *B29D 99/0005* (2021.05)

(58) Field of Classification Search
None
See application file for complete search history.

(56) References Cited

U.S. PATENT DOCUMENTS

| | | | |
|---|---|---|---|
| 5,671,678 | A | 9/1997 | Bolte et al. |
| 11,173,645 | B2 | 11/2021 | Cai et al. |
| 2019/0152120 | A1 | 5/2019 | Song et al. |
| 2019/0202119 | A1 | 7/2019 | Budge |
| 2021/0031466 | A1 | 2/2021 | Tran et al. |
| 2021/0347115 | A1 | 11/2021 | Fetfatsidis et al. |

(Continued)

FOREIGN PATENT DOCUMENTS

| | | | | |
|---|---|---|---|---|
| GB | 2053785 A | * | 2/1981 | ............. B29C 44/14 |
| JP | 2015147411 A | | 8/2015 | |

OTHER PUBLICATIONS

Combined Search and Examination Report Under Section 17, Great Britain Patent Application No. GB2305375.4 dated Sep. 19, 2023, Intellectual Property Office, Great Britain.

(Continued)

*Primary Examiner* — Barbara J Musser
(74) *Attorney, Agent, or Firm* — Stinson LLP

(57) ABSTRACT

An apparatus (2) for forming a noodle (20) within an elongate groove (14) of a product is provided comprising an extrusion system comprising at least one extruder nozzle (4) through which noodle material (16) is extruded, at least one levelling device (6) adjacent the extruder nozzle (4) which levels the noodle material (16), and a gantry system which moves the extruder nozzle (4) and the levelling device (6) along the elongate product groove (14), such that noodle material (16) is extruded along the product groove (14) and is levelled to form at least part of the noodle (20) within the product groove (14).

30 Claims, 15 Drawing Sheets

(56)                      References Cited

U.S. PATENT DOCUMENTS

2023/0087171 A1     3/2023  Tran et al.

OTHER PUBLICATIONS

European Search Report, Europe Patent Application No. 24169539.
4, dated Aug. 21, 2024, 8 pages, European Patent Office, Munich,
Germany.
Examination Report, Great Britain Patent Application No. 2305375.
4, dated May 8, 2025, 4 pages, patents Directorate, Newport, South
Wales.

\* cited by examiner

1

APPARATUS AND METHOD FOR THE MANUFACTURE OF NOODLES

REFERENCE TO RELATED APPLICATION

This application claims priority to Great Britain Patent Application No. 2305375.4, filed Apr. 12, 2023, the entire disclosure of which is incorporated herein by reference.

TECHNICAL FIELD

The present disclosure relates to an apparatus and method for the manufacture of noodles particularly, but not exclusively, for use in the aerospace industry.

BACKGROUND OF THE INVENTION

The aerospace industry is in active search for lightweight, high production rate solutions for the manufacture of components of aircraft for the electric vertical take-off and landing (eVTOL)/Urban Air Mobility (UAM) market. This will include the manufacture of gusset or radius fillers for aircraft products such as wings, see FIG. 1. The deltoid zone which occurs when two or three components of a product meet is filled with a noodle (also known as a gusset filler or a radius filler).

Functions of such noodles include prevention of cracking or delamination in the noodle regions of the product, providing conduits for facilitation of resin distribution for the product and prevention of product surface undulation and distortion. Multiple types of noodles exist, including adhesive noodles, foam adhesive noodles, laminated noodles, braid noodles, 3D weave noodles.

The common method of manufacturing noodles is to make a noodle having the same cross-sectional area as a gap of a product to be filled and forming the noodle to the shape of the gap with an open tool. A wide range of hardware has been developed for manufacturing noodles in this way. The noodle is then placed in the gap, generally manually. The required manual labour makes this method ineffective and expensive for mass production. The lack of a precisely-controlled procedure for placing the noodles introduces the possibility of human error and the appearance of manufacturing defects in the product.

It is an object of at least one aspect of the present invention to provide an improved apparatus and method for noodle manufacture.

SUMMARY OF THE INVENTION

According to a first aspect there is provided an apparatus for forming a noodle within an elongate groove of a product comprising:

an extrusion system comprising at least one extruder nozzle through which noodle material is extruded;

at least one levelling device adjacent the extruder nozzle which levels the noodle material; and a gantry system which moves the extruder nozzle and the levelling device along the elongate product groove, such that noodle material is extruded along the product groove and is levelled to form at least part of the noodle within the product groove.

Using the apparatus to form the noodle in the product groove has the following advantages:

automated/auto forming of noodles, in-place noodle manufacture, high noodle material deposition rate,

complete fill of product groove, ease of forming noodle shape, improved product structure toughness including damage tolerance, potential optimum weight solutions, improved product resin distribution options, advanced knowledge of noodle geometry not required, reduced post noodle forming operations such as deburring, trimming, machining etc.

Using the apparatus reduces the need for either accurate measurement or prediction of the actual noodle shape. In preformed noodles, this can vary across the noodle, either because of tapering dimensions and/or variation in preform noodle thicknesses.

The extruder nozzle may extrude noodle material along the product groove and the levelling device may level the noodle material to fill the product groove to form a noodle filling the product groove.

The extrusion system may comprise a hopper containing the noodle material and an extruder head connected to the hopper which pushes the noodle material through the extruder nozzle. The extruder head may be any of a pneumatic extruder head, a piston, a screw.

The levelling device may comprise any of a L-shaped smoothing plate, a roller, a smoothing head integrated with the extruder nozzle.

The apparatus may comprise a heater which heats a first part of the levelling device to control viscosity of the noodle material. The heater may comprise any of an induction heater, a laser, an infra-red heater, a gas discharge flash lamp, an electrical resistance heater.

The apparatus may comprise a cooler which cools a second part of the levelling device to solidify the noodle material. The cooler may comprise any of a circulating dry chilled air cooler, a circulating chilled fluid cooler, a Peltier effect cooler.

The apparatus may comprise a noodle material regulation system which regulates noodle material extrusion deposition rate into the product groove. The noodle material regulation system may regulate the noodle material extrusion deposition rate into the product groove to fill the product groove. The noodle material regulation system may regulate the noodle material deposition rate by regulating one or more operational parameters of the apparatus. The operational parameters may be any of hopper temperature, extruder head speed, gantry linear speed. The noodle material regulation system may regulate one or more operational parameters of the apparatus using feedback from a noodle measurement system.

The noodle measurement system may comprise a non-contact measurement device. The non-contact measurement device may comprise any of a radiation thermometer, a thermal imager, an optical pyrometer, a fibre optic temperature sensor, a laser system, a narrow beam radar system, a visual inspection system.

The noodle measurement system may comprise a contact measurement device. The contact measurement device may comprise a dancing arm system.

The apparatus may comprise a veil insertion system which inserts a veil between the noodle material and the product groove. The veil insertion system may comprise a veil dispenser which lays the veil into the product groove prior to extrusion of the noodle material. The veil insertion system may comprise a veil forming wheel to force the veil into place in the product groove. This may be used if the pressure of extrusion of noodle material into the product groove is not sufficient to force the veil into place in the groove.

The apparatus may comprise a trimmer which trims veil material protruding from one or more sides of the product groove. The trimmer may trim the veil material prior to or after noodle material extrusion. The trimmer may comprise any of a heated wire, a rotary pizza-style cutter.

The veil may comprise a light-weight material. The light weight material may be any of a light weight woven fabric or a light weight non-woven fabric. The veil made have a weight within a range from 2 g/m$^2$ up to 400 g/m$^2$, for example from 17 g/m$^2$ to 25 g/m$^2$. The weight can be tailored to suit the application requirements of the veil.

The veil may comprise at least one woven material. The veil may comprise at least one non-woven material. The non-woven material may be produced by any of fibre weaving, fibre knitting. The non-woven material may comprise non woven fabrics consisting of randomly dispersed or matted fibres. The non-woven material may comprise any of a glass fibre material, an E glass fibre material, a carbon fibre material, a nickel-coated carbon fibre material, a copper and nickel-coated carbon fibre material.

The veil may comprise at least one thermoplastics material. The thermoplastics material may comprise any of polyester, aramid, polyethylene terephthalate (PET), polyphenylene sulphide (PPS), polyamide-12 (PA), polyamide, polyimide, PEEK, PPS, PEI.

The veil may comprise at least one nano-sized material. The nano-sized material may comprise a carbon-based non-woven sheet material consisting of carbon nanotubes (CNTs). The CNTs may be any of single-walled carbon nanotubes (SWCNTs), multi-walled carbon nanotubes (MWCNTs). The CNTs may be made using one or sheets of graphene.

The product may comprise a material having an integral veil. The material having an integral veil may comprise a dry preforming tow which has a veil on both sides of the product groove.

The veil may be used to isolate the product from extreme parameters, such as temperature and pressure, occurring during noodle material extrusion. The veil may also be used to address potential reduction in resin flow paths around the noodle, created if the noodle material insertion pressures are excessive and restrict resin flow path. The veil may also be used if the chosen noodle material is not fully compatible with a resin used in the product. The use of a carbon fibre material for the veil will locally increase the percentage of carbon fibre at the periphery of the noodle, relieving stresses locally and concentrating their effect away from structural components of the product.

The apparatus may comprise a noodle embossing system which embosses an outer surface of the noodle. The noodle embossing system may comprise one or more raised pattern rollers. The one or more raised pattern rollers may be located adjacent the levelling device. This will emboss the outer surface of the noodle after the noodle material is extruded into the product groove and levelled. Alternatively, the noodle embossing system may emboss the outer surface of the noodle in a separate operation to extrusion and levelling of the noodle material. This may be achieved by using a malleable noodle material or by heating and softening the noodle material to facilitate penetration of rollers. Embossing of the outer surface of the noodle may be necessary to create paths for resin to be injected into the product and to improve mechanical keying between the resin and the noodle.

The apparatus may comprise a noodle knurling system which knurls an outer surface of the noodle. The noodle knurling system may comprise one or more knurls. These may comprise one or a series of small ridges or beads on a metal surface.

The apparatus may comprise a lead insertion system which inserts a lead within the noodle material. The lead insertion system may comprise a first lead supply spool and a second lead supply spool positioned on either side of the extrusion system. The first and second lead supply spools may lay the lead into the product groove prior to extrusion of the noodle material. The first and second lead supply spools may hold the lead centrally and under tension within the product groove.

The apparatus may comprise a heater disposed adjacent a portion of the lead for heating the lead. This will facilitate flow of noodle material around the lead. This is especially important for high viscosity noodle material options.

The apparatus may provide a sheath for a portion of the lead approximate an outer end of the product groove. This will protect the portion of the lead from product resin ingress.

The lead may be any of a circuit return ground lead, a bonding lead, an insulated power lead. The lead may be specifically tailored to meet the demands of its the application. The lead may have various cross-sectional areas and lengths.

The lead may comprise any of a braid, a rope, a twisted rope. The lead may comprise insulation. The insulation may comprise a coating, such as a thermoplastic insulation coating. The lead may comprise at least one identification element. The lead may comprise at least one termination element. The lead has to be terminated outside the end of part (EOP) of the product to create a wire tail and facilitate simplified electrical connection to the lead. In this case the favoured noodle termination system (see below) is use of a dam block positioned at an end of the noodle path with an access notch in the dam block to accommodate the lead.

The lead may comprise a material comprising any of copper, tin-plated copper, nickel plated copper, silver plated copper, aluminium, stainless steel, nickel. The lead may comprise a tin-plated copper material having an operating temperature in the range −65° C. to +150° C. The lead may comprise a nickel-plated copper material having an operating temperature in the range −65° C. to +260° C. The lead may comprise an insulated copper material having an operating temperature in the range −40° C. to +135° C.

The apparatus may comprise:

a first extruder nozzle through which noodle material for a first noodle outer section of a hollow noodle is extruded along a base of the product groove and a first levelling device adjacent the first extruder nozzle which levels the noodle material in the base of the product groove, a second extruder nozzle through which, after placement of a noodle inner section of the hollow noodle in the product groove, noodle material for a second noodle outer section of the hollow noodle is extruded along a first groove located at a first corner of the noodle inner section and a second levelling device adjacent the second extruder nozzle which levels the noodle material in the first groove, and a third extruder nozzle through which, after placement of the noodle inner section in the product groove, noodle material for a third noodle outer section of the hollow noodle is extruded along a second groove located at a second corner of the noodle inner section and a third levelling device adjacent the third extruder nozzle which levels the noodle material in the second groove.

The second extruder nozzle and the third extruder nozzle may simultaneously extrude noodle material along the first and second grooves. The apparatus may comprise a pick and place mechanism which places the noodle inner section in the product groove. Alternatively, the noodle inner section may be manually placed in the product groove.

The noodle inner section of the hollow noodle may comprise an outer skin forming a cavity therein. The outer skin may be any of a braided material, a fabric material, tow material. Such a noodle may be used to reduce the weight of the noodle in the product. A mandrel may be placed within the hollow noodle inner section.

The apparatus may comprise:

a first extruder nozzle through which noodle material for a first side of a hollow noodle is extruded, a second extruder nozzle through which noodle material for a second side of the hollow noodle is extruded, wherein, after suspension of a mandrel along the product groove, the first and second extruder nozzles simultaneously extrude noodle material along the product groove around first and second sides of the mandrel to form the first and second sides of the hollow noodle.

The apparatus may comprise a heater which heats the mandrel proximate the extruder nozzles. This will facilitate flow of the noodle material around the mandrel.

The apparatus may comprise:

a first extruder nozzle through which noodle material for a first side of a hollow noodle is extruded, a second extruder nozzle through which noodle material for a second side of the hollow noodle is extruded, a third extruder nozzle through which noodle material for a third side of the hollow noodle is extruded, and a levelling device adjacent the third extruder nozzle which levels the noodle material for the third side of the hollow noodle, wherein, after suspension of a mandrel along the product groove, the first, second and third extruder nozzles simultaneously extrude noodle material along the product groove to surround the mandrel and form the first, second and third sides of the hollow noodle.

The apparatus may comprise a heater which heats the mandrel proximate the extruder nozzles. This will facilitate flow of the noodle material around the mandrel.

The mandrel may comprise any of a metallic material, a polymeric material, a soluble polymeric material, a eutectic salt soluble material. The metallic material and the polymeric material may have high coefficient of thermal expansion (Cte) properties. The soluble polymeric material and the eutectic salt soluble material facilitate removal of the mandrel by washing-out.

The apparatus may comprise a noodle termination system. The noodle termination system may comprise a dam block positioned at an end of the noodle path and a control system to determine when the noodle material reaches a predetermined distance from the dam block and to cause the extrusion system to deliver a predetermined charge of noodle material which fills the product groove from the predetermined distance to the dam block.

The noodle termination system may comprise a fill block positioned at an end of the noodle path. The fill block may have a groove into which surplus noodle material is extruded beyond the end of the noodle. The surplus noodle material is then cut off.

The apparatus may comprise at least one noodle fixing device which holds the noodle in place on turning of the product. The noodle fixing device may comprise a grooved block and a clamp plate.

The noodle fixing device may comprise a plurality of tags secured to the noodle. These may apply a tensile load to hold the noodle in place on turning of the product. Surplus noodle material may then be cut off.

The noodle material preferably has a higher melting temperature than an infusion temperature and/or a cure temperature of a resin material used in the product. This will limit risks of geometric change of the product.

The noodle material is preferably compatible with a resin material used in the product. This will provide sufficient bonding strength between the noodle material and the resin material. In typical commercial aerospace requirements, a polyetherimide (PEI) noodle material has been shown to be compatible with epoxy thermoset resins.

The noodle material preferably has comparable or higher yield strength than a transverse tensile strength of a resin material used in the product.

The noodle material may comprise a thermoplastic material. The thermoplastic noodle material may comprise any of acrylonitrile butadiene styrene (ABS), polyethersulfone (PESU), polycarbonate (PC), polysulfone (PSU), thermoplastic polyurethane (TPU), polyetherimide (PEI), polyphthalamide (PPA), polyamide (PA), polyphenylene sulphide (PPS), polyethylene terephthalate glycol (PETG), polyaryletherketone (PAEK).

The noodle material may comprise reinforcing fibres. This will provide optimum structural properties (weight) and compatibility with the product. The noodle reinforcing fibres may be any of carbon fibres typically up to 25%, glass fibres typically up to 20%, cork fibres, wood pulp fibres.

The noodle material may comprise a 3D printed cork and thermoplastic polyurethane composite material. The thermoplastic polyurethane may have a specific gravity of 1.18 $g \cdot cm^{-3}$, a hardness of 95 (shore D) and a tensile strength of 42 MPa. The cork may have a granulometry inferior to 0.25 mm, a thermal conductivity of 0.045 $W \cdot m^{-1} \cdot K^{-1}$, a density of 120-240 $kg \cdot m^{-3}$ and a thermal diffusivity of $1 \times 10^{-6}$ $m^2 \cdot s^{-1}$. The noodle material may comprise a 3D microsphere filler and thermoplastic polyurethane foam material.

Noodle Reinforced Thermoplastic Material:

has a high viscosity which will not bleed or drain into the product and therefore not block resin fill paths for the product does not cure, therefore after placement within the product, it will not age or constrain the time within which resin filling of the product has to occur if embossed, the embossed pattern will remain in place to facilitate resin filling of the product has a compatible Cte with the product after lamination can enhance damage tolerance of preformed laminate avoids the need for filling the noodle with thermoset resin.

The noodle material may comprise a sheet moulding compound (SMC). The SMC may comprise a combination of fibre reinforcement and a themoset material. The fibre reinforcement may comprise any of glass fibre, carbon fibre. The thermoset material may comprise any of polyester, vinyl ester, epoxy. Short strand fibres may be matted together with an uncured thermoset material.

Components of the noodle material may be fed into the hopper of the extrusion system, heated and mixed to form the noodle material.

According to a second aspect there is a provided a method of manufacturing a noodle within an elongate groove of a product comprising:

using an extrusion system comprising at least one extruder nozzle to extrude noodle material therethrough;

using at least one levelling device adjacent the extruder nozzle to level the noodle material, and using a gantry system to move the extruder nozzle and the levelling device along the elongate product groove, such that noodle material is extruded along the product groove and is levelled to form at least part of the noodle within the product groove.

DESCRIPTION OF THE FIGURES

Embodiments of the disclosure will now be described, by way of example only, with reference to the following Figures in which.

DETAILED DESCRIPTION

Figure 1:
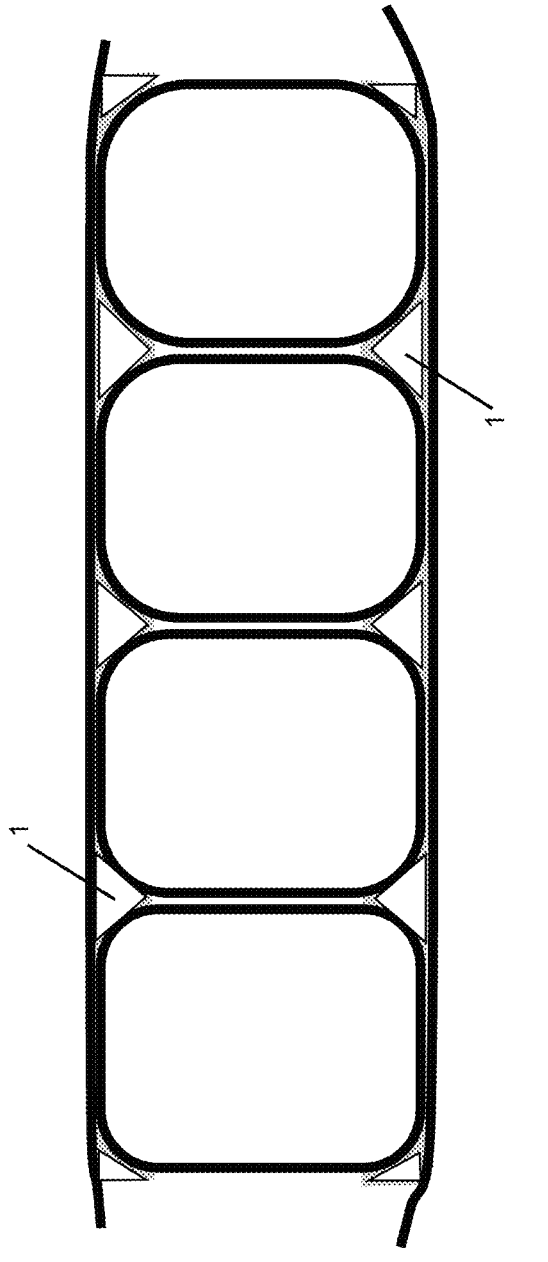
FIG. 1 is a sectional illustration of a multi spar wing box including noodles.

In the aerospace industry, noodles are used to fill gaps between multi-component products. FIG. 1 shows a cross section of a multi spar wing box, which includes noodles 1. Noodles may also be used in other industries, for example the automotive industry.

Figure 2:
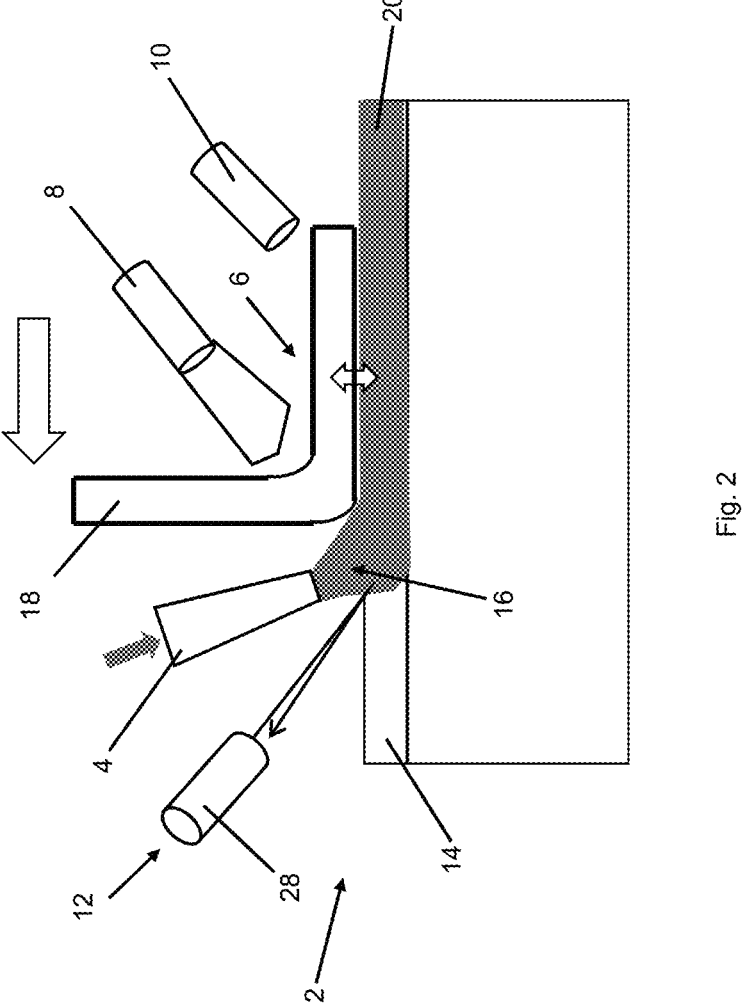
FIG. 2 is a sectional illustration of a first embodiment of an apparatus according to the first aspect.

Referring to FIG. 2, a first embodiment of an apparatus 2 for forming a noodle within an elongate groove of a product is shown. The apparatus 2 comprises an extrusion system comprising an extruder nozzle 4, a levelling device 6 adjacent the extruder nozzle 4, a gantry system (not shown), a heater 8, a cooler 10 and a noodle material regulation system 12.

The extrusion system comprises a hopper (not shown) containing noodle material and a screw extruder head (not shown) connected to the hopper which pushes the noodle material through the extruder nozzle 4. Components of the noodle material, comprising, for example, thermoplastic granules and a filler, are fed into the hopper, heated and using the revolving screw extruder head, mixed to form a thermoplastic noodle material.

The gantry system moves the extruder nozzle 4 along an elongate product groove 14 (noodle cavity) and the noodle material 16 is extruded into the groove 14.

The gantry system also moves the levelling device 6, comprising an L-shaped smoothing plate 18, along the elongate product groove 14. The L-shaped smoothing plate 18 levels the noodle material 16, providing height control of the material, to fill the product groove 14 to form a noodle 20 which fills the product groove 14. The heater 8 heats a first part of the L-shaped smoothing plate 6 proximate the extruder nozzle 4. This controls viscosity of the noodle material 16 as it is extruded. The cooler 10 cools a second part of the L-shaped smoothing plate 6 proximate an end of the plate. This solidifies the noodle material 16 after it has been extruded.

Figure 3:
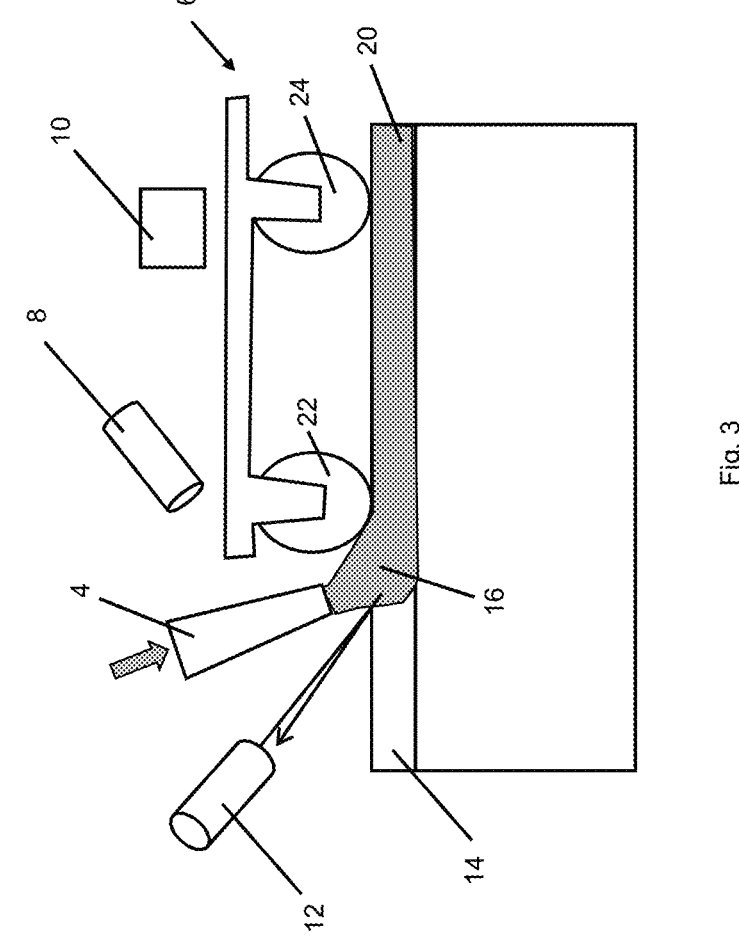
FIG. 3 is a sectional illustration of a second embodiment of an apparatus according to the first aspect.

Referring to FIG. 3, a second embodiment of an apparatus 2 for forming a noodle within an elongate groove of a product is shown. The apparatus 2 comprises an extrusion system comprising an extruder nozzle 4, a levelling device 6 adjacent the extruder nozzle 4, a gantry system (not shown), a heater 8, a cooler 10 and a noodle material regulation system 12. In this embodiment the levelling device 6 comprises first and second rollers 22, 24.

The gantry system moves the extruder nozzle 4 along an elongate product groove 14 (noodle cavity) and the noodle material 16 is extruded into the groove 14. The gantry system also moves the first and second rollers 22, 24 along the elongate product groove 14 which level the noodle material 16, providing height control of the material, to fill the product groove 14 to form a noodle 20 which fills the product groove 14. The heater 8 heats the first roller 22 proximate the extruder nozzle 4. This controls viscosity of the noodle material 16 as it is extruded. The cooler 10 cools the second roller 24 proximate an end of the levelling device. This solidifies the noodle material 16 after it has been extruded.

The heater of each embodiment may comprise any of an induction heater, a laser, an infra-red heater, a gas discharge flash lamp, an electrical resistance heater. The cooler of each embodiment may comprise any of a circulating dry chilled air cooler, a circulating chilled fluid cooler, a Peltier effect cooler.

Figure 4:
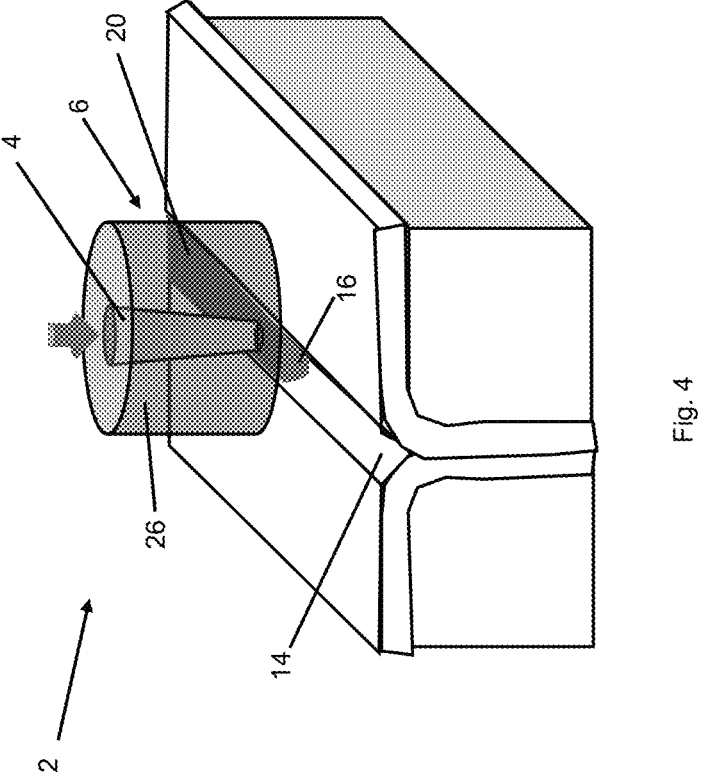
FIG. 4 is a perspective illustration of a third embodiment of an apparatus according to the first aspect.

Referring to FIG. 4, a third embodiment of an apparatus 2 for forming a noodle within an elongate groove of a product is shown. The apparatus 2 comprises an extrusion system comprising an extruder nozzle 4, a levelling device 6 adjacent the extruder nozzle 4 and a gantry system (not shown). In this embodiment the levelling device 6 comprises a smoothing head 26 which is integrated with the extruder nozzle 4.

The gantry system moves the extruder nozzle 4 along an elongate product groove 14 (noodle cavity) and the noodle material 16 is extruded into the groove 14. The gantry system also moves the smoothing head 26 along the elongate product groove 14 which levels the noodle material 16, providing height control of the material, to fill the product groove 14 to form a noodle 20 which fills the product groove 14.

The apparatus 2 of FIGS. 2 and 3 comprises a noodle material regulation system 12. In these embodiments, this comprises a noodle measurement system having a non-contact measurement device 28. The non-contact measurement device 28 may comprise any of a radiation thermometer, a thermal imagers, an optical pyrometer, a fibre optic temperature sensors, a laser system, a narrow beam radar system, a visual inspection system. The non-contact measurement device 28 measures the height of the noodle material 16 as it is extruded.

Figure 5:
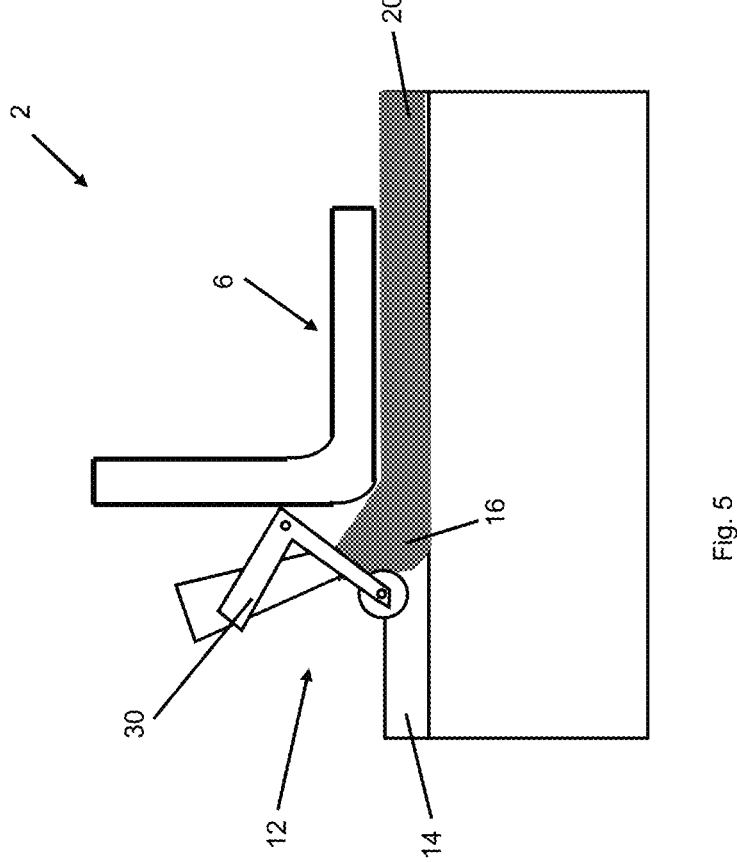
FIG. 5 is a sectional illustration of an apparatus according to the first aspect comprising a contact noodle measurement system.

Referring to FIG. 5, the apparatus 2 comprises a noodle material regulation system 12. In this embodiment, this comprises a noodle measurement system having a contact measurement device 30 which is a dancing arm system. The arm is attached to the levelling device 6 and comprises a roller in contact with extruded noodle material 16 to measure the height of the material as it is extruded.

The noodle material regulation systems 12 use feedback from the non-contact and contact measurement devices 28, 30 of the noodle measurement systems to regulate noodle material extrusion deposition rate. In these embodiments, the noodle material extrusion deposition rate is regulated such that product groove is filled with noodle material. The noodle material regulation system regulates the noodle material deposition rate by regulating one or more operational parameters of the apparatus 2. The operational parameters may be any of hopper temperature, extruder head speed, gantry linear speed. For example, if the noodle material deposition rate is too high, this may be regulated by either decreasing the extruder head speed or increasing the gantry linear speed.

Figure 6:
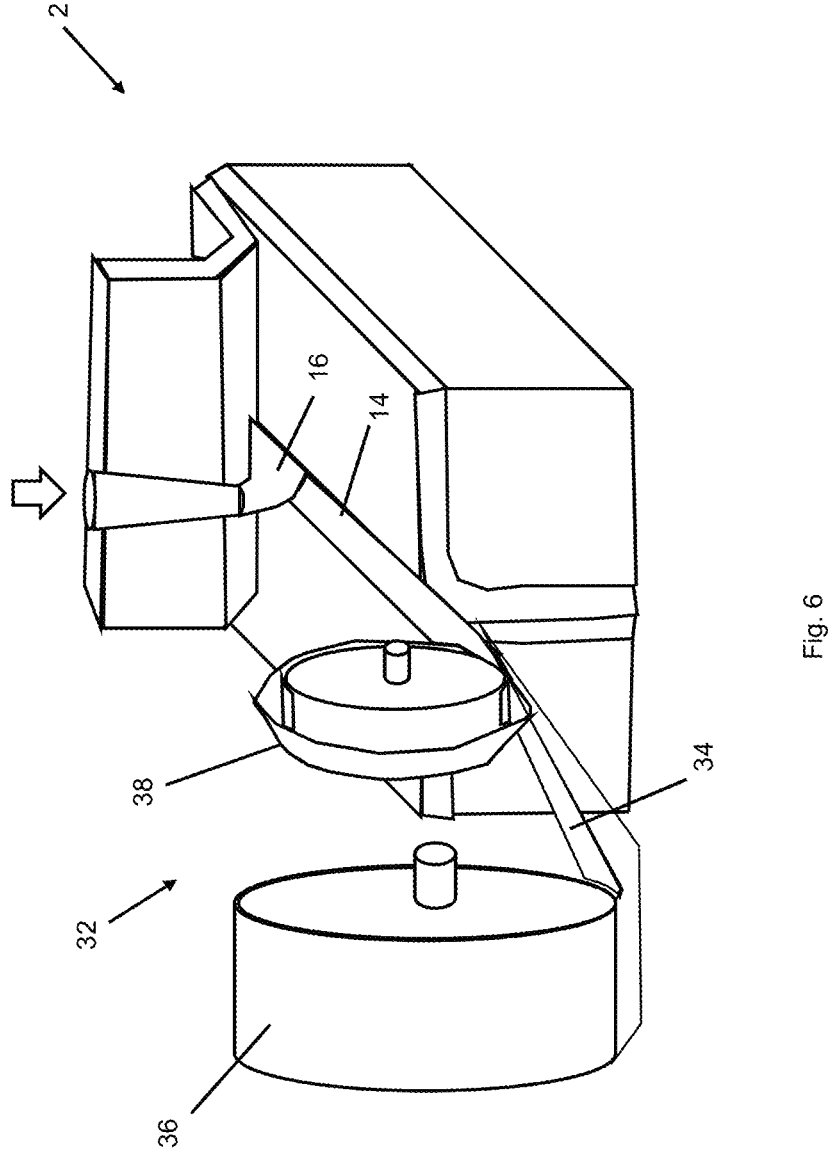
FIG. 6 is a perspective illustration of an apparatus according to the first aspect comprising a veil insertion system.

Referring to FIG. 6, the apparatus 2 comprises a veil insertion system 32 which inserts a veil 34 between the noodle material 16 and the product groove 14. The veil insertion system 32 comprises a veil dispenser 36 and a veil forming wheel 38. The veil dispenser 36 lays the veil 34 into the product groove 14 prior to extrusion of the noodle material 16. The veil forming wheel 38 forces the veil 34 into place in the product groove 14. This is used when the pressure of extrusion of noodle material 16 into the product groove 14 is not sufficient to force the veil 34 into place in the groove 14.

After insertion of the veil 34, there may be extra veil material protruding from each side of the groove 14. This could be left in place to facilitate the injection of resin for the product under the noodle material 16. Alternatively, the apparatus 2 may comprise a trimmer (not shown) which trims veil material protruding from one or more sides of the product groove 14. The trimmer may trim the veil material prior to or after noodle material extrusion. The trimmer may comprise any of a heated wire, a rotary pizza-style cutter.

The veil may comprise a light-weight material. The light weight material may be any of a light weight woven fabric or a light weight non-woven fabric. The veil made have a weight within a range from 2 g/m$^2$ up to 400 g/m$^2$, for example from 17 g/m$^2$ to 25 g/m$^2$. The weight can be tailored to suit the application requirements of the veil.

The veil may comprise at least one woven material. The veil may comprise at least one non-woven material. The non-woven material may be produced by any of fibre weaving, fibre knitting. The non-woven material may comprise non woven fabrics consisting of randomly dispersed or matted fibres. The non-woven material may comprise any of a glass fibre material, an E glass fibre material, a carbon fibre material, a nickel-coated carbon fibre material, a copper and nickel-coated carbon fibre material.

The veil 34 may comprise at least one non-woven material. The non-woven material may comprise any of a glass fibre material, an E glass fibre material, a carbon fibre material, a nickel-coated carbon fibre material, a copper and nickel-coated carbon fibre material. The veil may comprise at least one thermoplastics material. The thermoplastics material may comprise any of polyester, aramid, polyethylene terephthalate (PET), polyphenylene sulphide (PPS), polyamide-12 (PA), polyamide, polyimide, PEEK, PPS, PEI. The veil may comprise at least one nano-sized material. The nano-sized material may comprise a carbon-based non-woven sheet material consisting of carbon nanotubes (CNTs). The CNTs may be any of single-walled carbon nanotubes (SWCNTs), multi-walled carbon nanotubes (MWCNTs). The CNTs may be made using one or sheets of graphene.

The veil 34 may be used to isolate the product from extreme parameters, such as temperature and pressure, occurring during noodle material extrusion. The veil 34 may also be used to address potential reduction in resin flow paths around the noodle, created if the noodle material insertion pressures are excessive and restrict resin flow path. The veil 34 may also be used if the chosen noodle material is not fully compatible with a resin used in the product. The use of a carbon fibre material for the veil 34 will locally increase the percentage of carbon fibre at the periphery of the noodle, relieving stresses locally and concentrating their effect away from structural components of the product.

Figure 7:
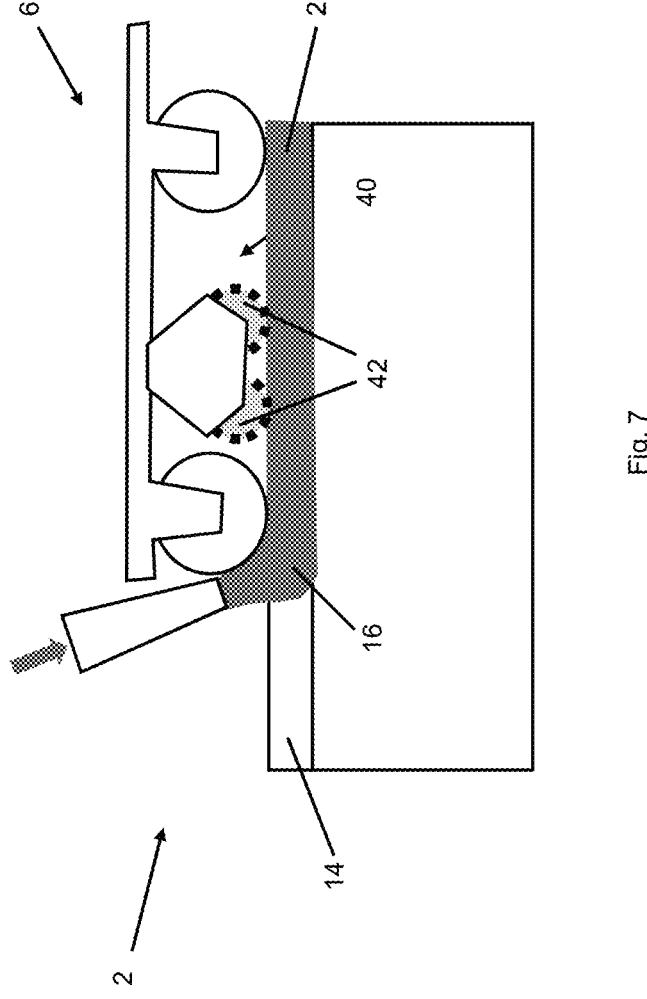
FIG. 7 is a sectional illustration of an apparatus according to the first aspect comprising a noodle embossing system.

Referring to FIG. 7, the apparatus 2 comprises a noodle embossing system 40 which embosses an outer surface of the noodle 20. The noodle embossing system 40 comprise two raised pattern rollers 42, located adjacent the levelling device 6. The rollers 42 emboss the outer surface of the noodle 20 after the noodle material 16 is extruded into the product groove 14 and levelled. Alternatively, the noodle embossing system may emboss the outer surface of the noodle in a separate operation to extrusion and levelling of the noodle material. This may be achieved by using a malleable noodle material or by heating and softening the noodle material to facilitate penetration of rollers. Embossing of the outer surface of the noodle 20 may be necessary to create paths for resin to be injected into the product and to improve mechanical keying between the resin and the noodle 20.

Figure 8:
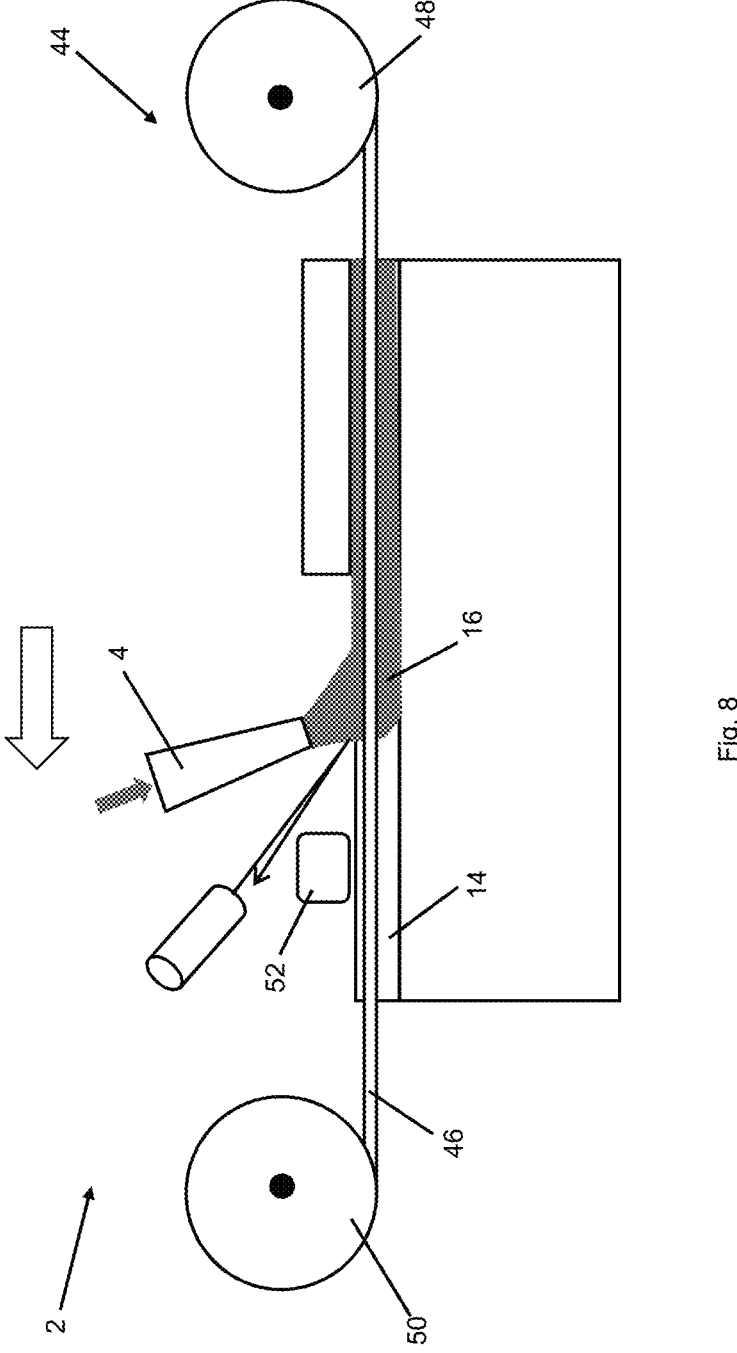
FIG. 8 is a sectional illustration of an apparatus according to the first aspect comprising a lead insertion system.

Referring to FIG. 8, the apparatus 2 comprises a lead insertion system 44 which inserts a lead 46 within the noodle material 16. The lead insertion system 44 comprises a first lead supply spool 48 and a second lead supply spool 50 positioned on either side of the extrusion nozzle 4. The first and second lead supply spools 48, 50 lay the lead 46 into the product groove 14 prior to extrusion of the noodle material 16. The first and second lead supply spools 48, 50 hold the lead 46 centrally and under tension within the product groove 14.

The apparatus 2 comprises a heater 52 disposed adjacent a portion of the lead 46 for heating the lead. This will facilitate flow of noodle material 16 around the lead 46. This is especially important for high viscosity noodle material options.

The apparatus may provide a sheath (not shown) for a portion of the lead approximate an outer end of the product groove. This will protect the portion of the lead from product resin ingress. The lead 46 may be any of a circuit return ground lead, a bonding lead, an insulated power lead. The lead 46 may be specifically tailored to meet the demands of its the application. The lead may have various cross-sectional areas and lengths.

The lead 46 may comprise any of a braid, a rope, a twisted rope. The lead 46 may comprise insulation such as a thermoplastic insulation coating. The lead 46 may comprise at least one identification element. The lead 46 may comprise at least one termination element. The lead has to be terminated outside the EOP of the product to create a wire tail and facilitate simplified electrical connection to the lead. In this case a preferred noodle termination system (see below) is use of a dam block positioned at an end of the noodle path with an access notch in the dam block to accommodate the lead. The lead 46 may comprise a material comprising any of copper, tin-plated copper, nickel plated copper, silver plated copper, aluminium, stainless steel, nickel. The lead 46 may comprise a tin-plated copper material having an operating temperature in the range –65° C. to +150° C., or a nickel-plated copper material having an operating temperature in the range –65° C. to +260° C., or an insulated copper material having an operating temperature in the range –40° C. to +135° C.

Figure 9:
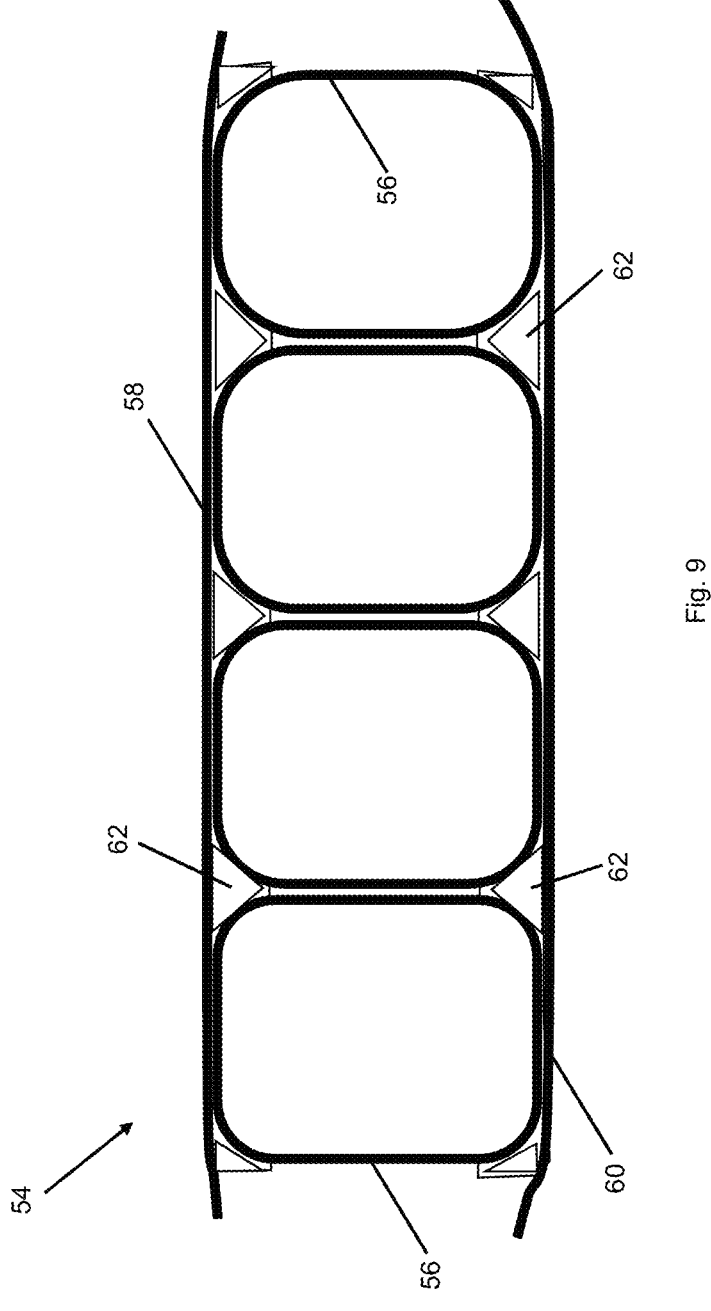
FIG. 9 is a sectional illustration of a multi spar wing box including multiple hollow noodles.

Referring to FIG. 9, a multi spar wing box 54 is shown. This comprises spars 56, an upper skin 58 and a lower skin 60. Multiple hollow noodles 62 are disposed between the spars 56 and the upper and lower skins 58, 60, as shown.

Figure 10:
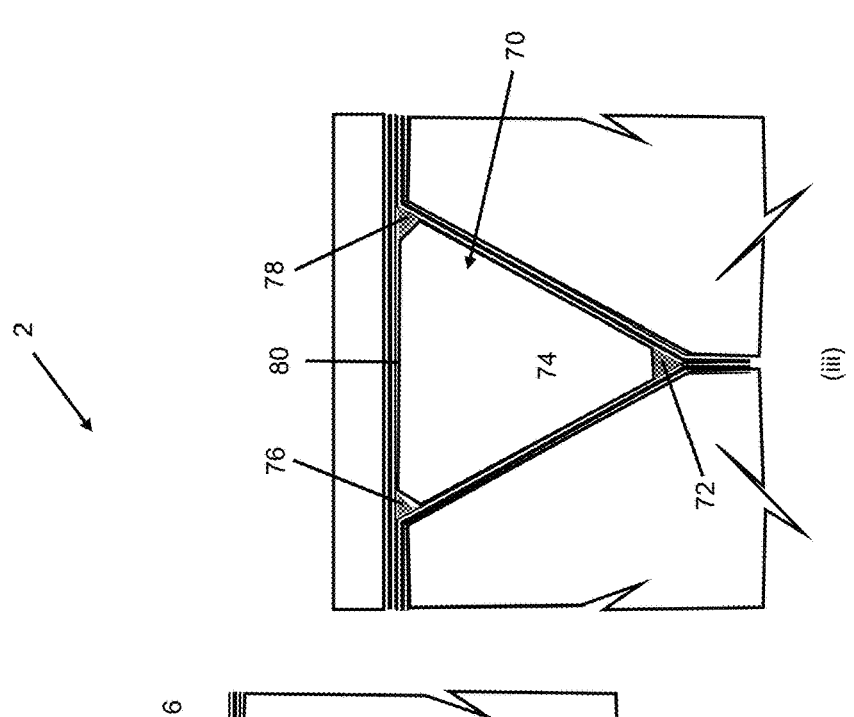
FIGS. 10 (i), (ii) and (iii) are sectional illustrations of an apparatus according to the first aspect for manufacturing a first embodiment of a hollow noodle.
Figure 10:
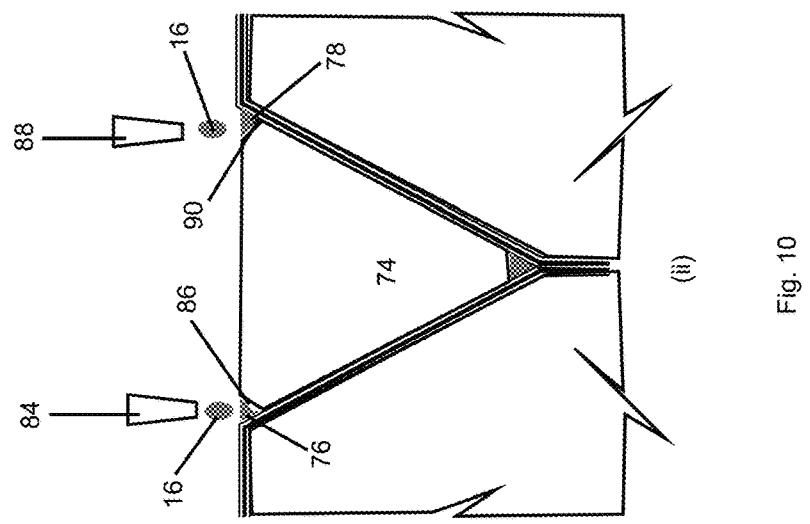
Figure 10:
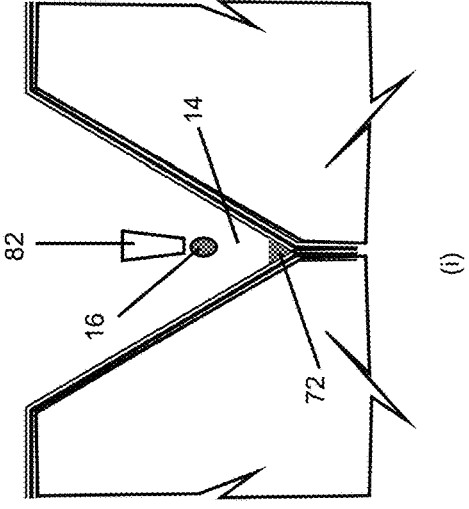

Referring to FIGS. 10 (*i*), (*ii*) and (*iii*), an apparatus 2 for manufacturing a first embodiment of a hollow noodle is shown. The hollow noodle 70 (FIG. 10 (*iii*)) comprises a first noodle outer section 72, a hollow noodle inner section 74, a second noodle outer section 76 and a third noodle outer section 78. The noodle inner section 74 has a deltoid shape with apexes removed. The noodle inner section 74 comprises an outer skin 80 forming a cavity therein. The outer skin 80 may be any of a braided material, a fabric material, carbon fibre material.

The apparatus 2 comprises:

a first extruder nozzle 82 through which noodle material 16 for the first noodle outer section 72 of the hollow noodle 70 is extruded along a base of the product groove 14 and a first levelling device (not shown) adjacent the first extruder nozzle 82 which levels the noodle material 16 in the base of the product groove 14, a second extruder nozzle 84 through which, after placement of the noodle inner section 74 of the hollow noodle 70 in the product groove 14, noodle material 16 for the second noodle outer section 76 of the hollow noodle 70 is extruded along a first groove 86 located at a first corner of the noodle inner section 74 and a second levelling device (not shown) adjacent the second extruder nozzle 84 which levels the noodle material 16 in the first groove 86, and a third extruder nozzle 88 through which, after placement of the noodle inner section 74 in the product groove 14, noodle material 16 for the third noodle outer section 78 of the hollow noodle 70 is extruded along a second groove 90 located at a second corner of the noodle inner section 74 and a third levelling device (not shown) adjacent the third extruder nozzle 88 which levels the noodle material 16 in the second groove 90.

The second extruder nozzle 84 and the third extruder nozzle 88 preferably simultaneously extrude noodle material 16 along the first and second grooves 86, 90. The apparatus 2 may comprise a pick and place mechanism (not shown) which places the noodle inner section 74 in the product groove 14. Alternatively, the noodle inner section 74 may be manually placed in the product groove 14. A mandrel (not shown) may be placed within the hollow noodle inner section 74.

The noodle inner section 74 is hollow and therefore has a weight which is much less than that of a similar volume of noodle material. The first, second and third noodle outer sections 72, 76, 78, comprising noodle material 16, are significantly reduced in size thus reducing the noodle material used. Thus the overall weight of the noodle 70 is reduced which reduces the weight of the noodle 70 in the product.

Figure 11:
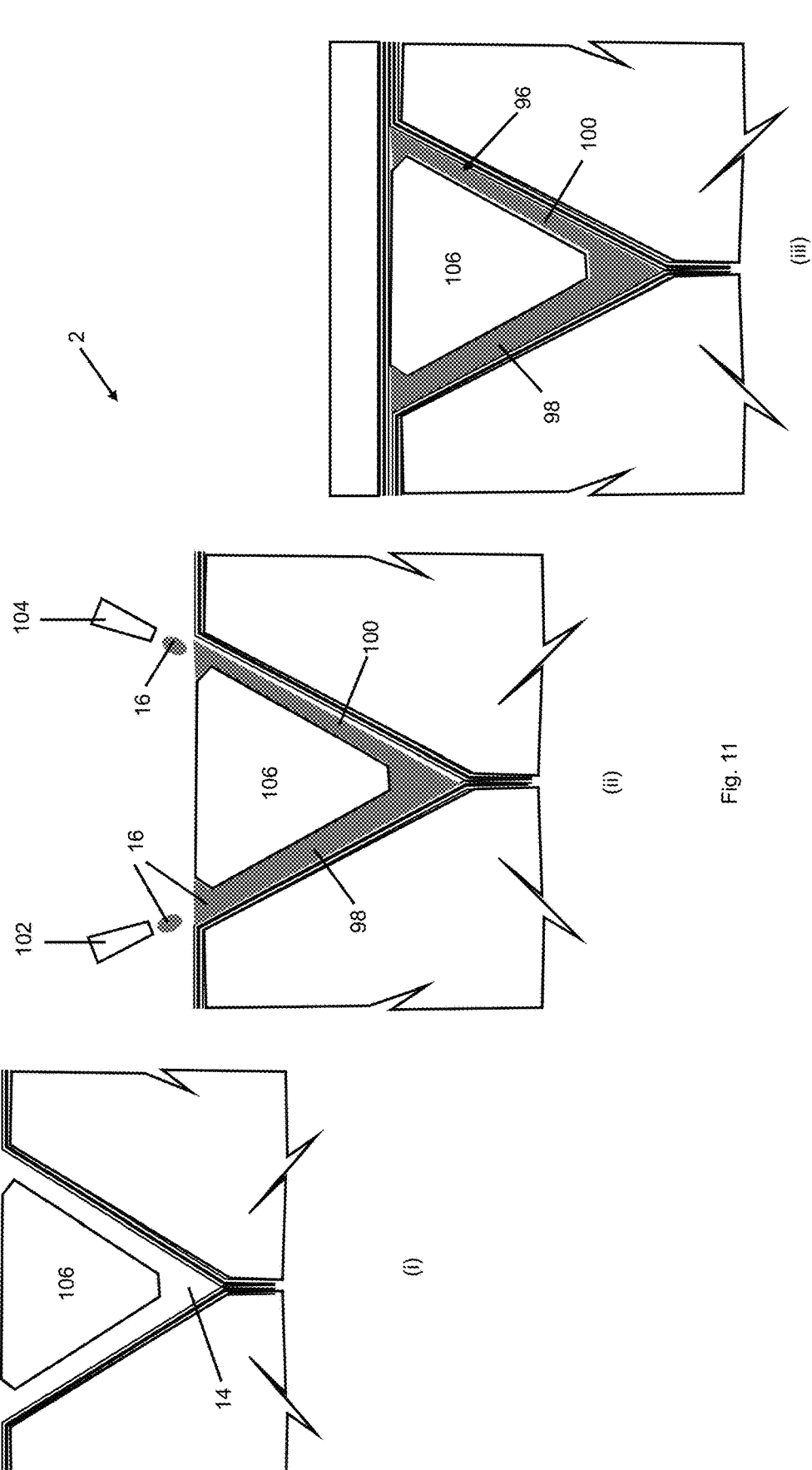
FIGS. 11 (i), (ii) and (iii) are sectional illustrations of an apparatus according to the first aspect for manufacturing a second embodiment of a hollow noodle.

Referring to FIGS. 11 (*i*), (*ii*) and (*iii*), an apparatus 2 for manufacturing a second embodiment of a hollow noodle is shown. The hollow noodle 96 (FIG. 11 (*iii*)) comprises a first side 98 and a second side 100 both of noodle material 16.

The apparatus 2 comprises:

a first extruder nozzle 102 through which noodle material 16 for the first side 98 of the hollow noodle 96 is extruded, a second extruder nozzle 104 through which noodle material 16 for the second side 100 of the hollow noodle 96 is extruded, wherein, after suspension of a mandrel 106 along the product groove 14, the first and second extruder nozzles 102, 104 simultaneously extrude noodle material 16 along the product groove 14 around first and second sides of the mandrel to form the first and second sides 98, 100 of the hollow noodle 96.

The apparatus 2 comprises a heater (not shown) which heats the mandrel 106 proximate the extruder nozzles 102, 104. This will facilitate flow of the noodle material 16 around the mandrel 106.

Figure 12:
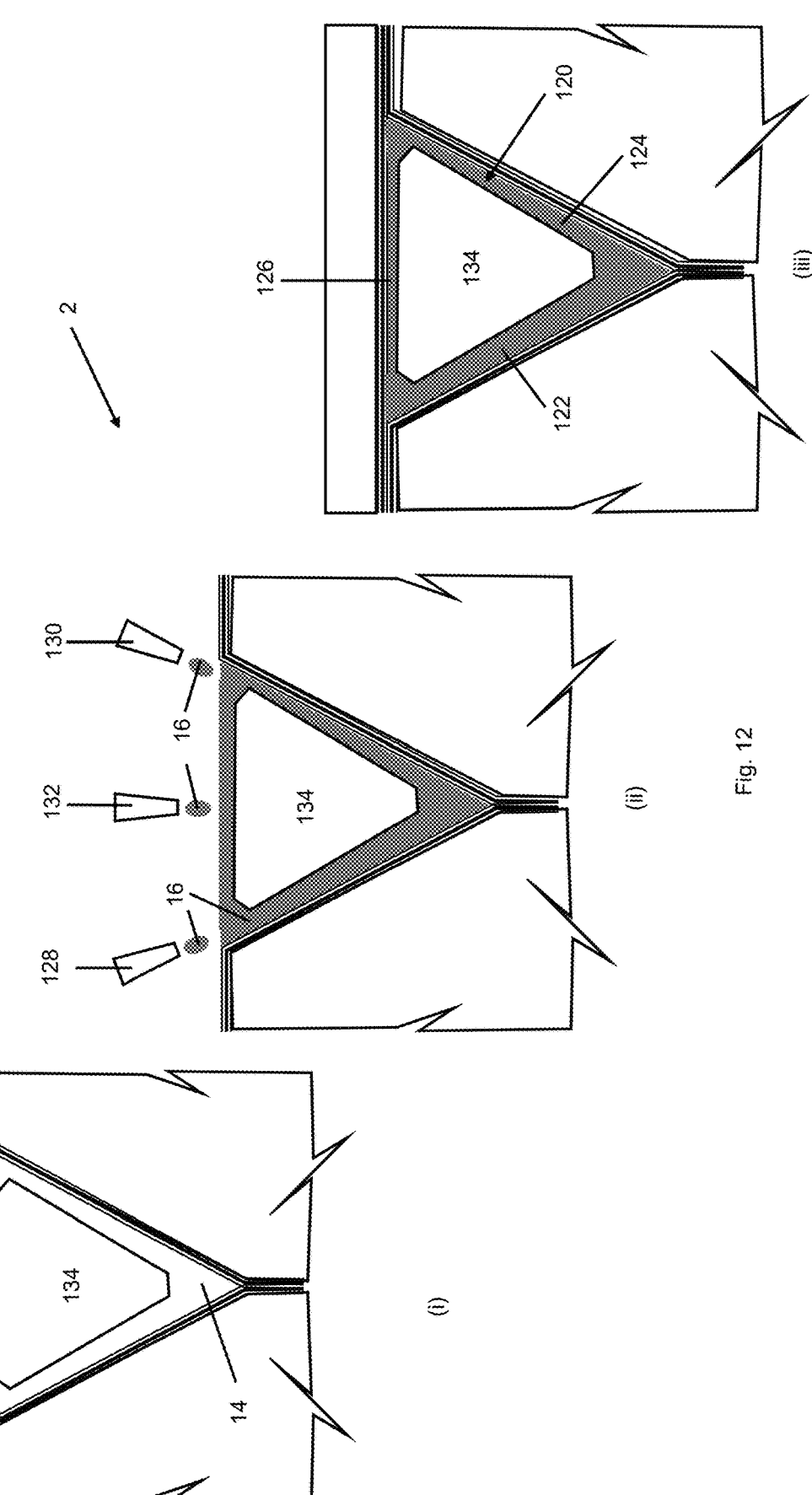
FIGS. 12 (i), (ii) and (iii) are sectional illustrations of an apparatus according to the first aspect for manufacturing a third embodiment of a hollow noodle.

Referring to FIGS. 12 (*i*), (*ii*) and (*iii*), an apparatus 2 for manufacturing a third embodiment of a hollow noodle is shown. The hollow noodle 120 (FIG. 12 (*iii*)) comprises a first side 122, a second side 124 and a third side 126, each of noodle material 16.

The apparatus 2 comprises:

a first extruder nozzle 128 through which noodle material 16 for the first side 122 of the hollow noodle 120 is extruded, a second extruder nozzle 130 through which noodle material 16 for the second side 124 of the hollow noodle 1200 is extruded, a third extruder nozzle 132 through which noodle material 16 for the third side 126 of the hollow noodle 120 is extruded, and a levelling device (not shown) adjacent the third extruder nozzle 132 which levels the noodle material 16 for the third side 126 of the hollow noodle 120, wherein, after suspension of a mandrel 134 along the product groove 14, the first, second and third extruder nozzles 128, 130, 132 simultaneously extrude noodle material 16 along the product groove 14 to surround the mandrel and form the first, second and third sides 122, 124, 126 of the hollow noodle 120.

The apparatus 2 comprises a heater (not shown) which heats the mandrel 134 proximate the extruder nozzles 128, 130, 132. This facilitates flow of the noodle material 16 around the mandrel 134.

The mandrels used above may comprise any of a metallic material, a polymeric material, a soluble polymeric material, a eutectic salt soluble material. The metallic material and the polymeric material may have high Cte properties. The soluble polymeric material and the eutectic salt soluble material facilitate removal of the mandrel by washing-out.

Figure 13:
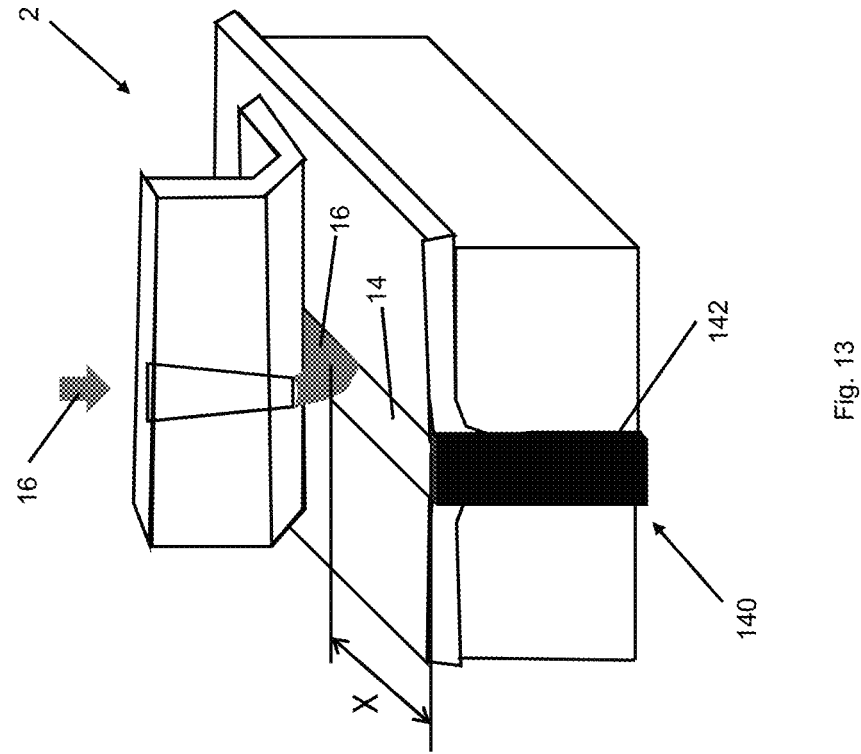
FIG. 13 is a perspective illustration of an apparatus according to the first aspect comprising a first embodiment of a noodle termination system.

Referring to FIG. 13, the apparatus 2 comprises a first embodiment of a noodle termination system 140. This comprises a dam block 142 positioned at an end of the noodle path in the groove 14. When the noodle material 16 reaches a predetermined distance X from the dam block 142, as determined by the non-contact measurement system (not shown), the non-contact measurement system is turned off. The extrusion system then delivers a predetermined charge of noodle material 16 which fills the product groove 14 from the predetermined distance X to the dam block 142.

Figure 14:
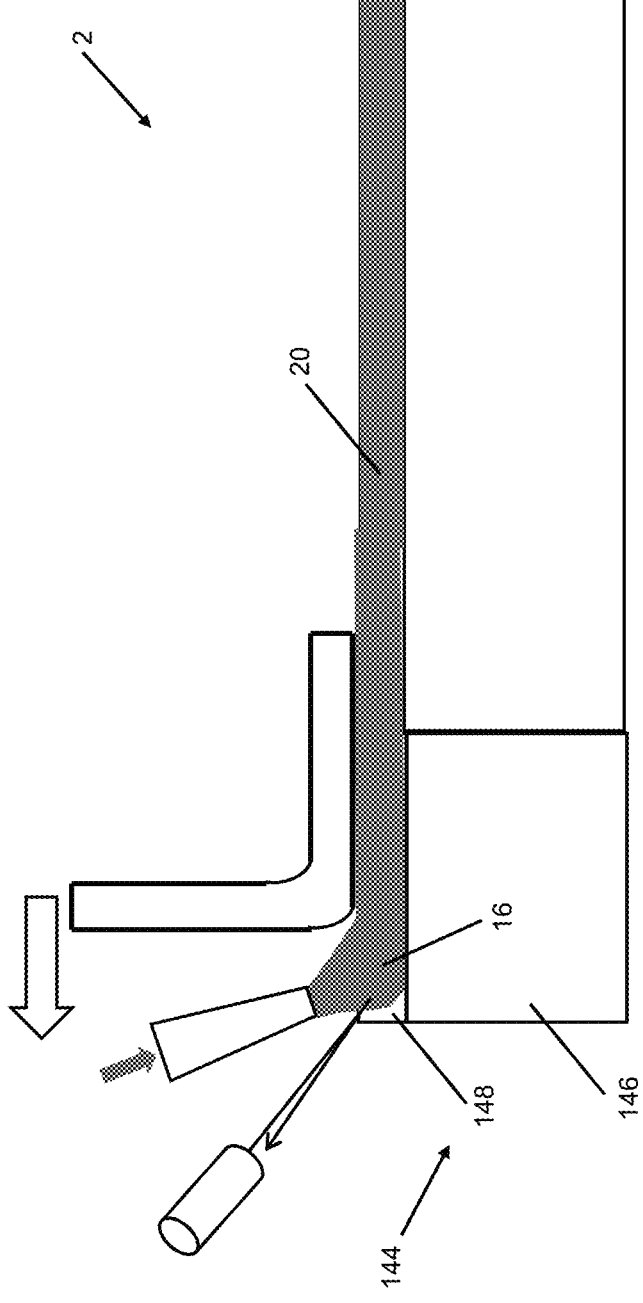
FIG. 14 is a sectional illustration of an apparatus according to the first aspect comprising a second embodiment of a noodle termination system.

Referring to FIG. 14, the apparatus 2 comprises a second embodiment of a noodle termination system 144. This comprises a fill block 146 positioned at an end of the noodle path in the groove (not shown). The fill block 146 has a groove 148 into which surplus noodle material 16 is extruded beyond the end of the noodle 20. The surplus noodle material 16 is then cut off.

In the majority of cases the noodle 20 will be securely tacked in position in the product groove 14, the tacking being activated by the heat and pressure of the noodle material. However on the rare case where, depending on the noodle material used and/or low noodle material temperature and pressure, there is a risk that the noodle 20 will fall out of the product groove 14 when the product is turned. The apparatus 2 may comprise at least one noodle fixing device (not shown) which holds the noodle 20 in place on turning of the product. The noodle fixing device may comprise a grooved block and a clamp plate or tags.

Figure 15:
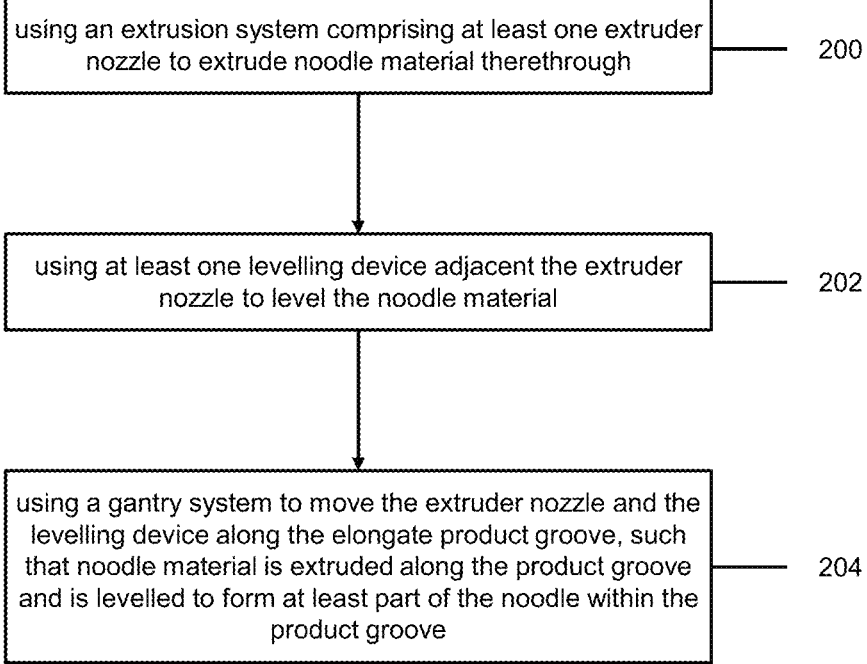
FIG. 15 is a flow chart of an embodiment of a method of manufacturing a noodle according to the second aspect.

Referring to FIG. 15, a method of manufacturing a noodle within an elongate groove of a product is shown. Step 200 comprises using an extrusion system comprising at least one extruder nozzle to extrude noodle material therethrough. Step 202 comprises using at least one levelling device adjacent the extruder nozzle to level the noodle material. Step 204 comprises using a gantry system to move the extruder nozzle and the levelling device along the elongate product groove, such that noodle material is extruded along the product groove and is levelled to form at least part of the noodle within the product groove.

The noodle material preferably has a higher melting temperature than an infusion temperature and/or a cure temperature of a resin material used in the product. This will limit risks of geometric change of the product.

The noodle material is preferably compatible with a resin material used in the product. This will provide sufficient bonding strength between the noodle material and the resin material. In typical commercial aerospace requirements, a polyetherimide (PEI) noodle material has been shown to be compatible with epoxy thermoset resins.

The noodle material preferably has comparable or higher yield strength than a transverse tensile strength of a resin material used in the product.

The noodle material may comprise a thermoplastic material. The thermoplastic noodle material may comprise any of acrylonitrile butadiene styrene (ABS), polyethersulfone (PESU), polycarbonate (PC), polysulfone (PSU), thermoplastic polyurethane (TPU), polyetherimide (PEI), polyphthalamide (PPA), polyamide (PA), polyphenylene sulphide (PPS), polyethylene terephthalate glycol (PETG), polyaryletherketone (PAEK).

The noodle material may comprise reinforcing fibres. This will provide optimum structural properties (weight) and compatibility with the product. The noodle reinforcing fibres may be any of carbon fibres typically up to 25%, glass fibres typically up to 20%, cork fibres, wood pulp fibres. The noodle material may comprise a light weight filler.

The noodle material may comprise a 3D printed cork and thermoplastic polyurethane composite material. The thermoplastic polyurethane may have a specific gravity of 1.18 g·cm$^{-3}$, a hardness of 95 (shore D) and a tensile strength of 42 MPa. The cork may have a granulometry inferior to 0.25 mm, a thermal conductivity of 0.045 W·m$^{-1}$·K$^{-1}$, a density of 120-240 kg·m$^{-3}$ and a thermal diffusivity of $1\times10^{-6}$ m$^2$·s$^{-1}$. The noodle material may comprise a 3D microsphere filler and thermoplastic polyurethane foam material.

Noodle Reinforced Thermoplastic Material:

has a high viscosity which will not bleed or drain into the product and therefore not block resin fill paths for the product.

does not cure, therefore after placement within the product, it will not age or constrain the time within which resin filling of the product has to occur.

if embossed, the embossed pattern will remain in place to facilitate resin filling of the product.

has a compatible Cte with the product after lamination can enhance damage tolerance of preformed laminate.

avoids the need for filling the noodle with thermoset resin.

The noodle material may comprise a sheet moulding compound (SMC). The SMC may comprise a combination of fibre reinforcement and a themoset material. The fibre reinforcement may comprise any of glass fibre, carbon fibre. The thermoset material may comprise any of polyester, vinyl ester, epoxy. Short strand fibres may be matted together with an uncured thermoset material.

The noodle material preferably has a higher melting temperature than an infusion temperature and/or a cure temperature of a resin material used in the product. This will limit risks of geometric change of the product.

The noodle material is preferably compatible with a resin material used in the product. This will provide sufficient bonding strength between the noodle material and the resin material. In typical commercial aerospace requirements, a polyetherimide (PEI) noodle material has been shown to be compatible with epoxy thermoset resins.

Components of the noodle material may be fed into the hopper of the extrusion system, heated and mixed to form the noodle material.

The invention claimed is:

1. An apparatus for forming a noodle within an elongate groove of a product comprising:

an extrusion system comprising at least one extruder nozzle through which noodle material is extruded, at least one levelling device adjacent the extruder nozzle which levels the noodle material, a heater which heats a first part of the levelling device proximate the extruder nozzle to control viscosity of the noodle material, and a gantry system which moves the extruder nozzle and the levelling device along the elongate product groove, such that noodle material is extruded along the product groove and is levelled to form at least part of the noodle within the product groove.

2. An apparatus according to claim 1 in which the extruder nozzle extrudes noodle material along the product groove and the levelling device levels the noodle material to fill the product groove to form a noodle filling the product groove.

3. An apparatus according to claim 1 in which the levelling device comprises any of a L-shaped smoothing plate, a roller, or a smoothing head integrated with the extruder nozzle.

4. An apparatus according to claim 1 comprising a cooler which cools a second part of the levelling device proximate an end of the device to solidify the noodle material.

5. An apparatus according to claim 1 comprising a noodle material regulation system which regulates noodle material extrusion deposition rate into the product groove by regulating one or more operational parameters of the apparatus, using feedback from a noodle measurement system.

6. An apparatus according to claim 1 comprising a veil insertion system which inserts a veil between the noodle material and the product groove.

7. An apparatus according to claim 1 further comprising a noodle embossing system which embosses an outer surface of the noodle.

8. An apparatus according to claim 1 further comprising a lead insertion system which inserts a lead within the noodle material.

9. An apparatus according to claim 1 comprising:
a first extruder nozzle through which noodle material for a first noodle outer section of a hollow noodle is extruded along a base of the product groove and a first levelling device adjacent the first extruder nozzle which levels the noodle material in the base of the product groove,
a second extruder nozzle through which, after placement of a noodle inner section of the hollow noodle in the product groove, noodle material for a second noodle outer section of the hollow noodle is extruded along a first groove located at a first corner of the noodle inner section and a second levelling device adjacent the second extruder nozzle which levels the noodle material in the first groove, and
a third extruder nozzle through which, after placement of the noodle inner section in the product groove, noodle material for a third noodle outer section of the hollow noodle is extruded along a second groove located at a second corner of the noodle inner section and a third levelling device adjacent the third extruder nozzle which levels the noodle material in the second groove.

10. An apparatus according to claim 1 comprising:
a first extruder nozzle through which noodle material for a first side of a hollow noodle is extruded,
a second extruder nozzle through which noodle material for a second side of the hollow noodle is extruded,
wherein, after suspension of a mandrel along the product groove, the first and second extruder nozzles simultaneously extrude noodle material along the product groove around first and second sides of the mandrel to form the first and second sides of the hollow noodle.

11. An apparatus according to claim 1 comprising:
a first extruder nozzle through which noodle material for a first side of a hollow noodle is extruded,
a second extruder nozzle through which noodle material for a second side of the hollow noodle is extruded,
a third extruder nozzle through which noodle material for a third side of the hollow noodle is extruded, and
a levelling device adjacent the third extruder nozzle which levels the noodle material for the third side of the hollow noodle,
wherein, after suspension of a mandrel along the product groove, the first, second and third extruder nozzles simultaneously extrude noodle material along the product groove to surround the mandrel and form the first, second and third sides of the hollow noodle.

12. An apparatus according to claim 1 comprising a noodle termination system comprising a dam block positioned at an end of the noodle path and a control system to determine when the noodle material reaches a predetermined distance from the dam block and cause the extrusion system to deliver a predetermined charge of noodle material into the product groove from the predetermined distance to the dam block.

13. An apparatus according to claim 1 comprising a noodle termination system comprising a fill block positioned at an end of the noodle path having a groove into which surplus noodle material is extruded beyond the end of the noodle.

14. A method of manufacturing a noodle within an elongate groove of a product comprising:
using an extrusion system comprising at least one extruder nozzle to extrude noodle material therethrough;
using at least one levelling device adjacent the extruder nozzle to level the noodle material,
using a heater to heat a first part of the levelling device proximate the extruder nozzle to control viscosity of the noodle material, and
using a gantry system to move the extruder nozzle and the levelling device along the elongate product groove, such that noodle material is extruded along the product groove and is levelled to form at least part of the noodle within the product groove.

15. An apparatus for forming a noodle within an elongate groove of a product comprising:
an extrusion system comprising at least one extruder nozzle through which noodle material is extruded,
at least one levelling device adjacent the extruder nozzle which levels the noodle material,
a gantry system which moves the extruder nozzle and the levelling device along the elongate product groove, such that noodle material is extruded along the product groove and is levelled to form at least part of the noodle within the product groove, and
a cooler which cools a second part of the levelling device proximate an end of the device to solidify the noodle material.

16. An apparatus according to claim 15, comprising a heater which heats a first part of the levelling device proximate the extruder nozzle to control viscosity of the noodle material.

17. An apparatus according to claim 15, comprising a veil insertion system which inserts a veil between the noodle material and the product groove.

18. An apparatus according to claim 15, in which the extruder nozzle extrudes noodle material along the product groove and the levelling device levels the noodle material to fill the product groove to form a noodle filling the product groove.

19. An apparatus according to claim 15, comprising a noodle material regulation system which regulates noodle material extrusion deposition rate into the product groove by regulating one or more operational parameters of the apparatus, using feedback from a noodle measurement system.

20. An apparatus according to claim 15, comprising:
a first extruder nozzle through which noodle material for a first noodle outer section of a hollow noodle is extruded along a base of the product groove and a first levelling device adjacent the first extruder nozzle which levels the noodle material in the base of the product groove,
a second extruder nozzle through which, after placement of a noodle inner section of the hollow noodle in the product groove, noodle material for a second noodle outer section of the hollow noodle is extruded along a first groove located at a first corner of the noodle inner section and a second levelling device adjacent the second extruder nozzle which levels the noodle material in the first groove, and a third extruder nozzle through which, after placement of the noodle inner section in the product groove, noodle material for a third noodle outer section of the hollow noodle is extruded along a second groove located at a second corner of the noodle inner section and a third levelling device adjacent the third extruder nozzle which levels the noodle material in the second groove.

21. An apparatus according to claim 15, comprising:
a first extruder nozzle through which noodle material for a first side of a hollow noodle is extruded,
a second extruder nozzle through which noodle material for a second side of the hollow noodle is extruded,
wherein, after suspension of a mandrel along the product groove, the first and second extruder nozzles simultaneously extrude noodle material along the product groove around first and second sides of the mandrel to form the first and second sides of the hollow noodle.

22. An apparatus according to claim 15, comprising:
a first extruder nozzle through which noodle material for a first side of a hollow noodle is extruded,
a second extruder nozzle through which noodle material for a second side of the hollow noodle is extruded,
a third extruder nozzle through which noodle material for a third side of the hollow noodle is extruded, and
a levelling device adjacent the third extruder nozzle which levels the noodle material for the third side of the hollow noodle,
wherein, after suspension of a mandrel along the product groove, the first, second and third extruder nozzles simultaneously extrude noodle material along the product groove to surround the mandrel and form the first, second and third sides of the hollow noodle.

23. An apparatus according to claim 21, in which the extruder nozzle extrudes noodle material along the product groove and the levelling device levels the noodle material to fill the product groove to form a noodle filling the product groove.

24. An apparatus for forming a noodle within an elongate groove of a product comprising:
an extrusion system comprising at least one extruder nozzle through which noodle material is extruded,
a veil insertion system which inserts a veil between the noodle material and the product groove,
at least one levelling device adjacent the extruder nozzle which levels the noodle material, and
a gantry system which moves the extruder nozzle and the levelling device along the elongate product groove, such that noodle material is extruded along the product groove and is levelled to form at least part of the noodle within the product groove.

25. An apparatus according to claim 24, comprising a heater which heats a first part of the levelling device proximate the extruder nozzle to control viscosity of the noodle material and/or a cooler which cools a second part of the levelling device proximate an end of the device to solidify the noodle material.

26. An apparatus according to claim 24, comprising a noodle material regulation system which regulates noodle material extrusion deposition rate into the product groove by regulating one or more operational parameters of the apparatus, using feedback from a noodle measurement system.

27. An apparatus according to claim 24, comprising:
a first extruder nozzle through which noodle material for a first noodle outer section of a hollow noodle is extruded along a base of the product groove and a first levelling device adjacent the first extruder nozzle which levels the noodle material in the base of the product groove,
a second extruder nozzle through which, after placement of a noodle inner section of the hollow noodle in the product groove, noodle material for a second noodle outer section of the hollow noodle is extruded along a first groove located at a first corner of the noodle inner section and a second levelling device adjacent the second extruder nozzle which levels the noodle material in the first groove, and
a third extruder nozzle through which, after placement of the noodle inner section in the product groove, noodle material for a third noodle outer section of the hollow noodle is extruded along a second groove located at a second corner of the noodle inner section and a third levelling device adjacent the third extruder nozzle which levels the noodle material in the second groove.

28. An apparatus according to claim 24, comprising:
a first extruder nozzle through which noodle material for a first side of a hollow noodle is extruded,
a second extruder nozzle through which noodle material for a second side of the hollow noodle is extruded,
wherein, after suspension of a mandrel along the product groove, the first and second extruder nozzles simultaneously extrude noodle material along the product groove around first and second sides of the mandrel to form the first and second sides of the hollow noodle.

29. An apparatus according to claim 24, comprising:
a first extruder nozzle through which noodle material for a first side of a hollow noodle is extruded,
a second extruder nozzle through which noodle material for a second side of the hollow noodle is extruded,
a third extruder nozzle through which noodle material for a third side of the hollow noodle is extruded, and
a levelling device adjacent the third extruder nozzle which levels the noodle material for the third side of the hollow noodle,
wherein, after suspension of a mandrel along the product groove, the first, second and third extruder nozzles simultaneously extrude noodle material along the product groove to surround the mandrel and form the first, second and third sides of the hollow noodle.

30. A method of manufacturing a noodle within an elongate groove of a product comprising:
using an extrusion system comprising at least one extruder nozzle to extrude noodle material therethrough;
using at least one levelling device adjacent the extruder nozzle to level the noodle material,
using a gantry system to move the extruder nozzle and the levelling device along the elongate product groove, such that noodle material is extruded along the product groove and is levelled to form at least part of the noodle within the product groove, and
using a cooler to cool a second part of the levelling device proximate an end of the device to solidify the noodle material.

* * * * *